(12) United States Patent
Brinckmann et al.

(10) Patent No.: US 11,852,902 B2
(45) Date of Patent: Dec. 26, 2023

(54) CLEANER FOR CLEANING GRIPPERS FOR OPHTHALMIC LENSES

(71) Applicant: ALCON INC., Fribourg (CH)

(72) Inventors: Felix Brinckmann, Roßdorf (DE); Nils Schweizer, Bad König (DE); Roger Biel, Aschaffenburg (DE)

(73) Assignee: Alcon Inc., Fribourg (CH)

( * ) Notice: Subject to any disclaimer, the term of this patent is extended or adjusted under 35 U.S.C. 154(b) by 546 days.

(21) Appl. No.: 17/149,213

(22) Filed: Jan. 14, 2021

(65) Prior Publication Data

US 2021/0223578 A1 Jul. 22, 2021

Related U.S. Application Data

(60) Provisional application No. 62/961,862, filed on Jan. 16, 2020.

(51) Int. Cl.
*G02C 13/00* (2006.01)
*A47L 5/12* (2006.01)
*A47L 7/00* (2006.01)

(52) U.S. Cl.
CPC .............. *G02C 13/008* (2013.01); *A47L 5/12* (2013.01); *A47L 7/0052* (2013.01)

(58) Field of Classification Search
None
See application file for complete search history.

(56) References Cited

U.S. PATENT DOCUMENTS

| | | |
|---|---|---|
| 6,494,021 B1 | 12/2002 | Schlagel et al. |
| 6,502,876 B1 | 1/2003 | Stockhorst et al. |
| 7,887,111 B2 | 2/2011 | Hagmann |
| 8,801,066 B2 | 8/2014 | Biel et al. |
| 2003/0178862 A1 | 9/2003 | Hagmann et al. |
| 2004/0022889 A1 | 2/2004 | Russell |
| 2008/0257387 A1* | 10/2008 | Biel ................ A61L 12/147 134/42 |

FOREIGN PATENT DOCUMENTS

| | | | |
|---|---|---|---|
| CN | 108067492 A | 5/2018 | |
| EP | 1650128 A1 * | 4/2006 | ......... B29D 11/0024 |
| EP | 1650128 A1 | 4/2006 | |
| EP | 3372391 A2 | 9/2018 | |

* cited by examiner

*Primary Examiner* — Cristi J Tate-Sims
(74) *Attorney, Agent, or Firm* — Sheng-Hsin Hu

(57) ABSTRACT

A cleaner for cleaning grippers for the transport of ophthalmic lenses comprises:
  an exhaust air box comprising
    at least one inlet opening for allowing ambient air as well as lenses, lens parts, debris and fluid adhered to the grippers to be sucked into an interior of the exhaust air box,
    an outlet opening in fluid communication with the interior of the exhaust air box
  and
  a cleaner head arranged on the exhaust air box and comprising
    a plurality of receiver sleeves for receiving the grippers to be cleaned,
    a plurality of shutters, wherein each individual shutter of the plurality of shutters is arranged to open or close the fluid communication of at least one receiver sleeve (5) of the plurality of receiver sleeves (5) and the interior of the exhaust air box (1).

15 Claims, 2 Drawing Sheets

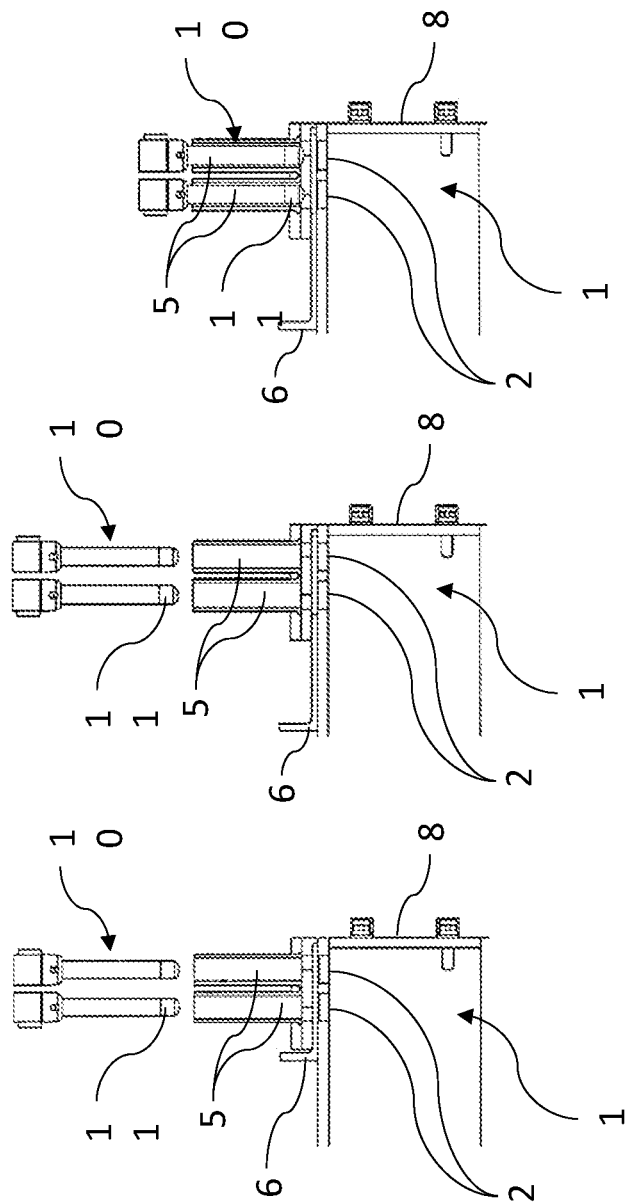

CLEANER FOR CLEANING GRIPPERS FOR OPHTHALMIC LENSES

FIELD OF THE INVENTION

The invention relates to a cleaner, a cleaning station as well as to a method for cleaning grippers for the transport of ophthalmic lenses such as contact lenses, in particular soft contact lenses, or intraocular lenses.

BACKGROUND

In the automated production of ophthalmic lenses in general, but especially in the production of large batches of contact lenses, as is the case for example with disposable soft contact lenses, it is necessary at certain stations in the production process to be able to manipulate the contact lenses safely, quickly and efficiently. An example of such manipulation of a contact lens is the removal of a contact lens from a test cell (e.g. inspection cuvette) in which said contact lens has been placed in a liquid, for example in water, in order to inspect the contact lens (e.g. by image processing) before the contact lens that has successfully passed the inspection is introduced into the primary packaging shell. To remove the inspected contact lens from such test cell grippers may be used. Such grippers may also be used at other stations in the production process. The contact lens is gripped with the aid of such gripper and, in the example described above, the contact lens is removed from the test cell.

The contact lens may then be placed into the primary packaging shell which is part of the final blister package (primary package) for the contact lens. A storage solution (e.g. saline) is then dispensed into the packaging shell. Finally, the packaging shell is sealed with a cover foil, and, after subsequent autoclaving, a number of such final blister packages (primary packages) can be placed into a secondary package (e.g. carton) which is then ready for distribution.

During the above-described removal of the contact lens from the test cell and the subsequent placement of the contact lens into the packaging shell, care must be taken to ensure that only the contact lens is adhering to the gripper and only a very small amount of water, preferably no water at all, is entrained with the contact lens. Otherwise, the saline may get diluted and its osmolarity may be changed. Additionally, when a lot change occurs, it has to be ensured that no contact lenses of the previous lot inadvertently adhering to the grippers are placed into primary packaging shells which are supposed to contain contact lenses of the next lot. Cleaning of the grippers may be performed manually, however, in case of a lot change the production line must then be stopped (i.e. production must be interrupted) for the manual cleaning of the grippers. In case of smaller lots, and in particular for lot changes on-the-fly (i.e. lot changes without interruption of the production line) manual cleaning of the grippers is not an option (risk of potential lot mix-up, loss of significant parts of small lots of ophthalmic lenses).

This is a problem which is not easy to solve, because during manipulation of contact lenses in the previous steps, lenses, lens parts, debris and fluid may adhere to the grippers, and may be transported to the primary packaging shell which is part of the final blister package, and may ultimately end up in the primary packaging shell.

It is therefore an object of the present invention to provide a method for reliably cleaning grippers for the transport of ophthalmic lenses such as contact lenses, from any lenses, lens parts, debris and fluid adhering to the grippers, with high efficiency.

SUMMARY

These and other objects are met by the cleaner, cleaning station and method of cleaning grippers for the transport of ophthalmic lenses, in accordance with the invention. Advantageous aspects of the invention are the subject of the dependent claims.

As used in the specification including the appended claims, the singular forms "a", "an", and "the" include the plural, unless the context explicitly dictates otherwise. When using the term "about" with reference to a particular numerical value or a range of values, this is to be understood in the sense that the particular numerical value referred to in connection with the "about" is included and explicitly disclosed, unless the context clearly dictates otherwise. For example, if a range of "about" numerical value a to "about" numerical value b is disclosed, this is to be understood to include and explicitly disclose a range of numerical value a to numerical value b. Also, whenever features are combined with the term "or", the term "or" is to be understood to also include "and" unless it is evident from the specification that the term "or" must be understood as being exclusive.

In particular, the present invention suggests a cleaner for cleaning grippers for the transport of ophthalmic lenses such as contact lenses, in particular soft contact lenses, or intraocular lenses. The cleaner comprises:
an exhaust air box comprising
at least one inlet opening for allowing ambient air as well as lenses, lens parts, debris and fluid adhered to the grippers to be sucked into an interior of the exhaust air box,
an outlet opening in fluid communication with the interior of the exhaust air box for allowing exhaust air to be vented from the interior of the exhaust air box, the outlet opening being capable of being connected to a vacuum source,
and
a cleaner head arranged on the exhaust air box and comprising
a plurality of receiver sleeves for receiving the grippers to be cleaned, each receiver sleeve of the plurality of receiver sleeves being arranged such that it is capable of being in fluid communication with the interior of the exhaust air box through the at least one inlet opening,
a plurality of shutters, wherein each individual shutter of the plurality of shutters is arranged to open or close the fluid communication of at least one receiver sleeve of the plurality of receiver sleeves, in particular a pair of receiver sleeves of the plurality of receiver sleeves, and the interior of the exhaust air box.

According to one aspect of the cleaner, the cleaner may further comprise linear drives, in particular pneumatic linear drives, to operate the shutters. In particular, each linear drive may operate an individual shutter, or may operate a pairs of shutters.

According to a further aspect of the cleaner, the exhaust air box may comprise a retainer sieve arranged in the interior of the exhaust air box such as to be passed by the air sucked into the interior of the exhaust air box through the at least one inlet opening and to retain the lenses, lens parts and debris sucked into the interior of the exhaust air box through the inlet opening. The exhaust air box further comprises a maintenance lid which can be opened for allowing access to the retainer sieve to remove from the retainer sieve the lenses, lens parts and debris retained by the retainer sieve.

According to still a further aspect of the cleaner, the cleaner may further comprise sensors for sensing the position of each shutter of the plurality of shutters, the pressure of the vacuum in the interior of the exhaust box and the position of the maintenance lid.

According to yet a further aspect of the cleaner, the cleaner may comprise a controller for monitoring the sensor outputs as well as for operating the shutters.

In particular, operation of the shutters may be controlled by the controller based on the sensor outputs.

Still in accordance with a further aspect of the cleaner, the exhaust air box may further comprise a liquid separator for separating the liquid sucked into the interior of the exhaust air box, and a liquid outlet in fluid communication with the liquid separator, for discharging the liquid from the liquid separator.

In accordance with another aspect of the cleaner, the cleaner head comprising the shutters and the receiver sleeves may be made of one block.

The present invention also suggests a cleaning station comprising a cleaner according to the invention, a plurality of grippers corresponding to the plurality of receiver sleeves and a vacuum source, for example an aspirator, connected to the outlet opening of the exhaust air box. The receiver sleeves have a sleeve wall having an inner surface surrounding an interior space of the sleeve which is circular in cross section and has an inner diameter. The grippers have a gripper wall having an outer surface which is circular in cross section and has an outer diameter. The inner diameter is at most 2.5 times as large as the outer diameter, particularly at most 1.5 times as large as the outer diameter. Frankly speaking, this means that the inner diameter of the sleeves is at most 2.5 times as large as the outer diameter of the gripper.

In particular, the receiver sleeves may be elongated tubular sleeves and the grippers may be elongated tubular grippers, and the inner diameter and the outer diameter, respectively, extend perpendicular to the direction of elongation.

Yet in accordance with another aspect of the cleaning station, the cleaner may comprise a sensor for sensing the pressure of the vacuum in the interior of the exhaust box and/or for sensing air flow of the suction generated by the vacuum source, and a controller for monitoring the sensor output of the sensor for sensing the pressure of the vacuum in the interior of the exhaust box as well as for controlling the vacuum source. Optionally, the position of each shutter of the plurality of shutters and/or the position of the maintenance lid may be considered by the controller in addition when controlling the vacuum source.

The present invention also suggests a method of cleaning grippers for the transport of ophthalmic lenses, in particular contact lenses or intraocular lenses. The method comprises:
providing a cleaner according to the invention,
providing grippers to be cleaned,
applying underpressure to the outlet opening of the exhaust air box,
introducing the grippers into the receiver sleeves of the cleaner head,
operating the shutters to open the fluid communications between the receiver sleeves and the interior of the exhaust air box through the inlet openings, in particular one after the other or pairwise, in order to apply suction to the grippers,
retracting the grippers from the receiver sleeves.

In particular, applying underpressure to the outlet opening of the exhaust air box may be performed with the aid of an aspirator which is capable of generating a high air flow rate at slightly reduced pressure.

The underpressure applied to the outlet opening of the exhaust air box generates an air flow through the receiver sleeves allowing for the removal of lenses, lens parts, debris and fluid from the grippers.

In accordance with one aspect of the method, first the underpressure is applied to the outlet opening of the exhaust air box and a first shutter of the shutters is then operated to open a first one or a first pair of the fluid communications between a corresponding first one or a first pair of the receiver sleeves and the interior of the exhaust air box prior to introducing the grippers into the receiver sleeves. The first shutter is operated to close the first one or the first pair of fluid communications once a first predetermined time interval has elapsed after the grippers have been introduced into and have arrived at a final position in the receiver sleeves. Subsequently, the remaining shutters other than the first shutter are operated one after the other, each of the operated remaining shutters opening and closing a respective further one or a respective further pair of fluid communications between a respective further one or a respective further pair of the receiver sleeves and the interior of the exhaust air box. Each of the remaining shutters is operated to close the respective further one or the respective further pair of fluid communications once a second predetermined time interval has elapsed after the respective further one or the respective further pair fluid communications has been opened.

The duration of the first and second predetermined time intervals may be identical or may be different.

In accordance with a still further aspect of the method, applying suction to the gripper includes allowing an air stream to flow between an inner surface of a sleeve wall of the respective receiver sleeve and an outer surface of a gripper wall of the respective gripper.

In accordance with another aspect of the method, the air flow of the suction is in the range of 200 $m^3/h$ to 450 $m^3/h$. The relative pressure of the reduced pressure in the interior of the exhaust air box in the range of up to 300 hPa below the surrounding atmospheric pressure at the cleaning station, in particular in the range of 10 hPa to 50 hPa, particularly in the range of 15 hPa to 45 hPa below the surrounding atmospheric pressure at the cleaning station.

According to a further aspect of the method, the grippers comprise gripper heads, and the grippers are moved into the receiver sleeves such that the gripper heads cannot contact the shutters when the shutters are arranged to close the fluid communications (in order to avoid collision with the shutters).

According to yet another aspect of the method, operating the shutters to open and close the fluid communications between the receiver sleeves and the interior of the air box is performed in a time interval (first predetermined time interval and second predetermined time interval) in the range of 200 ms to 800 ms.

The first (predetermined) time interval is the time interval between the time at which the first shutter (or shutter pair) is operated to open the fluid communications (in particular prior to introduction of the grippers into the receiver sleeves) and the time at which the first shutter (or shutter pair) is operated to close the fluid communications (in particular after the grippers have arrived at a final position in the receiver sleeves). Closing the fluid communications by operating the first shutter (or shutter pair) triggers operation of the remaining shutters (or shutter pairs) one after the other. The remaining shutters (or shutter pairs) are operated to remain opened for a second (predetermined) time interval.

The first and second predetermined time interval may be identical or different. The time intervals denote the duration that elapses from the time at which the shutter of pair of shutters reaches the (final) open position (i.e. has fully opened the fluid communication between the receiver sleeves and the interior of the exhaust air box) until being operated to leave the (final) open position during closing the fluid communication. In case the first shutter (or the first shutter pair) is opened prior to the grippers being introduced into the receiver sleeves, the first time interval denote the time at which the grippers reach the final position in the receiver sleeves until the time the first shutter (or first shutter pair) leaves the (final) open position to close the fluid communication.

In particular, the first time interval may be in the range of 200 ms to 500 ms and the second time interval may be in the range of 300 ms to 800 ms.

A further aspect of the invention relates to a method for transporting ophthalmic lenses, in particular contact lenses such as soft contact lenses, or intraocular lenses, from a respective start location to a respective destination location. The method comprises the steps of:

providing a plurality of ophthalmic lenses, each at a respective start location, providing a plurality of grippers corresponding to the plurality of ophthalmic lenses, each gripper of the plurality of grippers comprising a gripper head having a bearing surface, the bearing surface having at least one opening through which underpressure can be applied in order to suck the respective ophthalmic lens against the bearing surface, and through which overpressure can be applied in order to release the respective ophthalmic lens from the bearing surface, positioning the gripper head of each gripper of the plurality of grippers with its bearing surface closely adjacent to the respective ophthalmic lens at the respective start location, applying underpressure through the at least one opening in the bearing surface of each gripper of the plurality of grippers so as to suck the respective ophthalmic lens to adhere to the bearing surface of the respective gripper, moving each gripper of the plurality of grippers with the respective ophthalmic lens adhered to the bearing surface of the respective gripper to the respective destination location, applying overpressure through the at least one opening in the bearing surface of the respective gripper so as to release the respective ophthalmic lens from the bearing surface of the respective gripper at the respective destination location, and cleaning each gripper of the plurality of grippers, wherein cleaning each gripper of the plurality of grippers comprises cleaning each gripper using a method of cleaning according to the invention prior to each transportation of an ophthalmic lens from the respective start location to the respective destination location.

Alternatively, in the method for transporting ophthalmic lenses according the grippers are cleaned using the cleaning method according to the invention only after having transported a predetermined number of ophthalmic lenses, or at the discretion of the operator.

The afore-mentioned aspects of the invention have a number of advantages.

The cleaner may either be implemented in-line in a fully automated or semi-automated process for producing ophthalmic lenses, or may be used off-line separate from such fully automated or semi-automated process.

However, due to the very fast cleaning of the grippers by means of the cleaner and hence only a short cleaning time being needed as well as due to the small dimensions of the cleaner, the cleaner can be readily integrated into an existing automated production line. No downtime of the production line is required when the cleaner according to the invention is integrated into the production line, since the cleaning of the grippers may be done in-line. No removal of the grippers to be cleaned is necessary nor is there any need to interrupt production to achieve cleaning of the grippers.

The air flow through the space between the inner surface of the sleeve wall of the receiver sleeve and the outer surface of the gripper wall of the gripper is substantially accelerated through the introduction of the gripper into the receiver sleeve and just carries along any lenses, lens parts, debris and fluid adhering to the grippers (including the gripper head) and continues to flow into the exhaust air box. The lenses, lens parts, debris and fluid adhering to the grippers are thereby sucked into the interior of the exhaust air box.

Additionally, aspiration of air from the clean environment (the location where the production line is arranged which is typically a clean environment) into the exhaust air box has the advantage of avoiding contamination of the clean environment when compared to flushing the grippers. Flushing the grippers may result in spreading any flushing fluid, lenses, lens parts, debris and fluid adhered to the gripper into the clean environment, whereas the aspiration of air from the clean environment sucks any unwanted matter into the exhaust box where it is separated (e.g. by the retainer sieve or the liquid separator) and retained.

Opening or closing the fluid communication of only one receiver sleeve or of only a pair of receiver sleeves of the plurality of receiver sleeves and the interior of the exhaust air box allows for an air flow rate sufficient to achieve a reliable removal of lenses, lens parts, debris and fluid adhering to the grippers while maintaining the total air flow at a level which is suitable for the operation of the cleaner. Too high an air flow rate may result in an air flow which the clean room filter of the production line may not be able to handle without significantly increasing the dimensions of the clean room filter, so that aspiration of air from the clean environment may bypass the clean room filter which is to be avoided. Too low an air flow rate on the other hand may result in a non-reliable removal of lenses, lens parts, debris and fluid from the gripper.

The vacuum source to which the outlet opening of the exhaust air box may be connected may be an aspirator, in particular a wet vacuum aspirator, which has a high air flow rate at a slight underpressure (i.e. at a vacuum pressure slightly below the atmospheric pressure in the clean environment where the production line is arranged).

The exhaust air aspired by the vacuum source may be passed through a clean room filter and may then be returned to the clean environment of the location or room where the production line is arranged in order to avoid that the air control of this clean environment senses that there is a non-negligible airflow out of the clean environment in case the exhaust air would not be returned to the clean environment of the location or room where the production line is arranged but rather would be vented out of this location or room. Additionally, returning the (filtered) exhaust air into the clean environment of the location or room where the production line is arranged reduces the necessity of supplying additional clean air to compensate for the air which would have been vented to the exterior.

Furthermore, the invention is advantageous as regards the pneumatic linear drives operating the shutters to open and close the fluid communications of the receiver sleeves and the interior of the exhaust air box. These pneumatic linear drives are very reliable and can be readily integrated into an automated production line in which compressed air is generally available.

The retainer sieve which is accessible due to the presence of the maintenance lid that can be opened and closed reliably retains the lenses, lens parts, and debris sucked off of the grippers and may be easily removed and cleaned periodically, for example once a day. The maintenance lid allows for an easy access to the retainer sieve which may be replaced by a clean retainer sieve in order to avoid downtime of the production line.

Sensors may sense the position of each shutter of the plurality of shutters, the pressure of the vacuum in the interior of the exhaust air box and the position of the maintenance lid in order to further automate the cleaning process and to avoid any operation error caused by an operator. Such operation error may then lead, for example, to an alarm which will inform the operator and may allow the operator to remedy the error.

Operation of the shutters may be performed by a controller and may be based on the sensor outputs which are monitored by the controller. For example, when the vacuum pressure or the air flow generated by the vacuum source is determined sufficient, several shutters may be operated simultaneously to open the fluid communications between the receiver sleeves and the interior of the exhaust air box, or the time interval between operating the shutters to open and close the fluid communications may be adapted to the sensed pressure of the vacuum or the air flow.

Any liquid sucked into the interior of the exhaust air box may be separated by a liquid separator and collected at the lowermost region of the liquid separator and may be discharged either permanently or periodically with the aid of a valve at the outlet of the liquid separator, for example. The outlet may be connected to a vacuum line of the production line to remove the liquid collected in the liquid separator. The liquid separator allows for a direct connection of a vacuum source to the outlet opening of the exhaust air box. However, the vacuum source may also comprise additional liquid separators, if required, in order to return the aspired air (after being filtered and after any liquid being separated) into the clean environment of the location or room where the production line is arranged.

The outlet valve of the liquid separator may avoid any interference with the vacuum applied to the outlet opening of the exhaust air box (additional vacuum source in case the outlet of the liquid separator is connected to a vacuum line, or interfering air inlet in case the liquid outlet is at ambient pressure). The outlet valve may be operated by a controller. For that purpose, the cleaner may comprise a further sensor for sensing the level of the liquid in the liquid separator.

When the cleaner head comprising the shutters and the receiver sleeves is made of one block, only few fasteners need to be opened to remove the cleaner head for replacement, maintenance or cleaning, and hence reduces downtime of the production line as well as the risk of malfunction of the cleaner.

In particular, the shape of the receiver sleeves corresponds to the shape of the grippers. Generally, the shape of both the receiver sleeves and the grippers is tubular and cylindrical. The receiver sleeves have a sleeve wall having an inner surface surrounding an interior space of the sleeve which is cylindrical in cross-section and has an inner diameter The grippers have a gripper wall having an outer surface which is circular in cross-section as well and has an outer diameter.

When the inner diameter is at most 2.5 times, particularly at most 1.5 times as large as the outer diameter, the air flowing through the space between the tubular sleeve wall of the receiver sleeve and the gripper wall of the gripper is optimally accelerated by the introduction of the gripper into the receiver sleeve to effect sucking off any lenses, lens parts, debris and fluid adhering to the grippers into the exhaust air box.

Monitoring the pressure of the vacuum in the interior of the exhaust air box, the position of each shutter of the plurality of shutters, and the position of the maintenance lid allows for an efficient operation of the vacuum source. For example, the vacuum source may be shut down when the maintenance lid is opened, or alternatively run up when a plurality of shutters are operated to open a plurality of fluid communications at the same time.

While it is important to apply underpressure to the outlet opening of the exhaust air box to remove any lenses, lens parts, debris and fluid from grippers, underpressure may be applied either prior to introducing, while introducing, or after having introduced the grippers into the receiver sleeves of the cleaner head. Particularly, underpressure is applied prior to introducing the grippers into the receiver sleeves.

For example, underpressure may be applied to the outlet opening of the exhaust box and a first shutter (or shutter pair) may be operated to open the fluid communications before the grippers are introduced into the receiver sleeves. This allows for a continuous and steady operation of the vacuum source, in particular of the aspirator.

As already mentioned, the first and second predetermined time intervals may be identical or different. While underpressure may be applied to the outlet opening of the exhaust box and a first shutter (or shutter pair) is operated to open the fluid communication before introduction of the grippers into the receiver sleeves, the first gripper or pair of grippers is already exposed to suction during introduction of the grippers into the receiving sleeves. Hence, the time interval (counted from the time the first gripper or pair of grippers reach the final position in the receiver sleeve to the time of operating the first shutter to close the fluid communication) may be shortened when compared to the second time interval of the subsequently operated shutters, since all grippers are simultaneously introduced into the receiving sleeves.

Applying suction to the respective grippers allows an air stream to flow through the space between the inner surface of the sleeve wall and the outer surface of the gripper wall and accelerates the air flowing through that space and generates suction for the removing any lenses, lens parts, debris and fluid adhering to the grippers.

Introducing the grippers into the receiver sleeves such that the gripper heads are arranged at a distance of the shutters (such that the gripper heads cannot contact the shutters) avoids a collision of the gripper heads with the shutters (since all grippers may be introduced into all gripper sleeves at the same time, so that only one shutter may be in the position in which the fluid communication is open while all other shutters may be in the position in which the communication is closed). Thus, any damaging of the grippers or of the cleaner can be avoided.

It goes without saying, that in fully automated production lines for the mass production of ophthalmic lenses, in particular soft contact lenses or intraocular lenses, a plurality of grippers may be arranged in a side by side configuration, for example, a side-by-side configuration of 2×8 grippers, in order to simultaneously manufacture a greater number of lenses. For an effective production, preferably all grippers of the plurality of grippers (or at least a number of the plurality of grippers) can be simultaneously introduced into the receiver sleeves of the cleaner.

Advantages that are described for the cleaner also apply to the method for cleaning the grippers and vice versa.

It is to be noted, that each individual feature described herein as well as all combinations of two or more of such features are possible as long as such features are not mutually exclusive or are otherwise technically incompatible.

The afore-mentioned embodiments are practical embodiments for removing lens material deposited on a lens forming surface in general.

BRIEF DESCRIPTION OF THE DRAWINGS

Further advantageous aspects of the invention become apparent from the following description of embodiments of the invention with the aid of the schematic drawings in which:

FIG. 2a shows a cleaning station according to the invention with a shutter arranged in a position in which it closes the fluid communications between the receiver sleeves and an interior of the exhaust air box;

FIG. 2b shows the cleaning station of FIG. 2a, with the shutter arranged in a position in which it opens the fluid communications; and FIG. 2c shows the cleaning station of FIG. 2b, with the grippers being introduced into the receiver sleeves for being cleaned.

Figure 1:
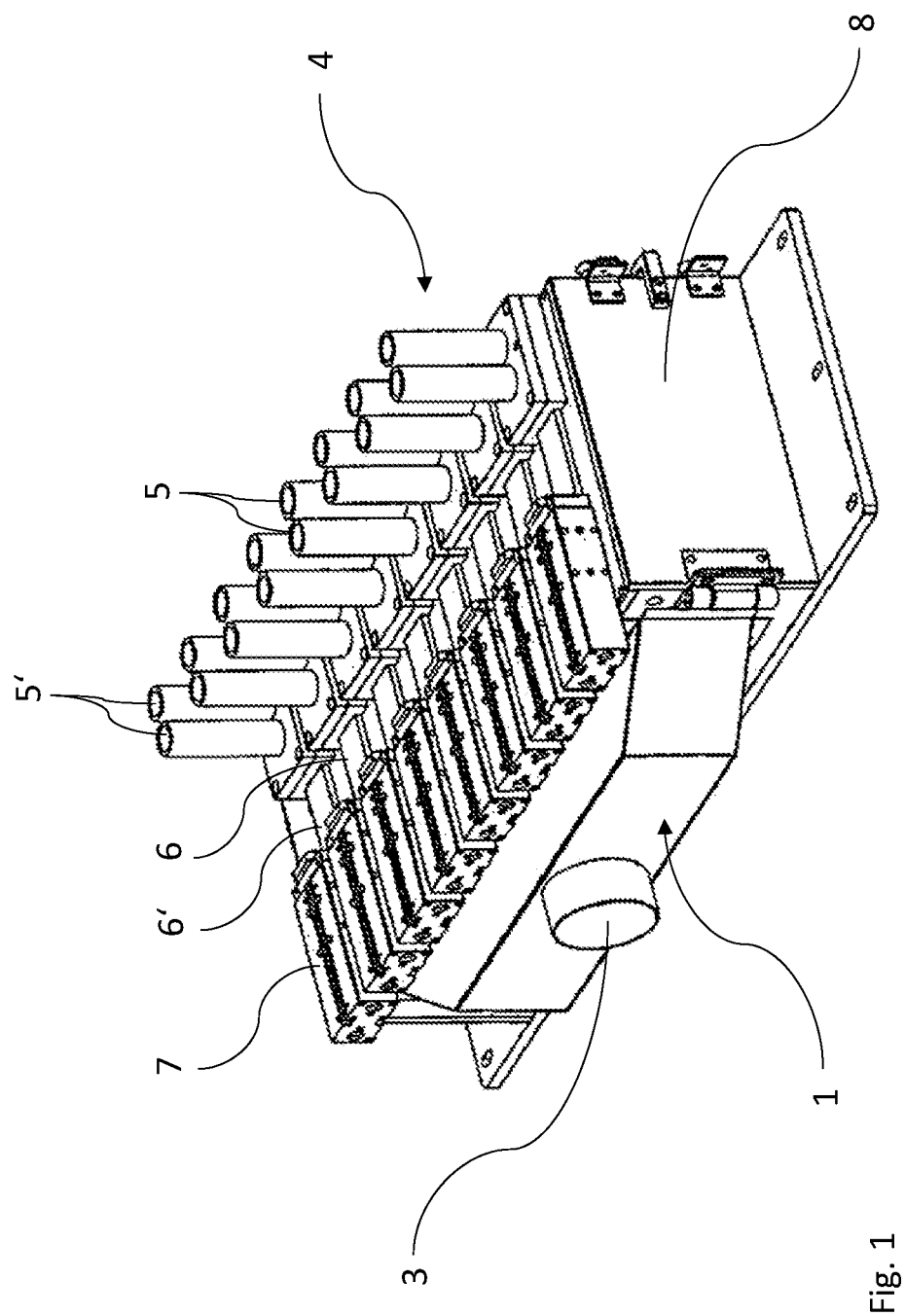
FIG. 1 shows an exemplary embodiment of a cleaner according to the invention.

The present invention will be described in connection with certain preferred aspects or embodiments. However, it is to be understood that there is no intent to limit the invention to the aspects or embodiments described. On the contrary, the intention is to cover all alternatives, modifications, and equivalents as may be included within the spirit and scope of the invention as defined by the appended claims.

DETAILED DESCRIPTION

The following description is for illustrative purposes only and is not intended to limit the scope of the invention.

FIG. 1 shows a cleaner for cleaning grippers for the transport of soft contact lenses. In this embodiment, a total of sixteen receiving sleeves 5 are arranged in two rows of eight receiving sleeves 5 and are capable of receiving eight pairs of grippers (in a matching two rows of eight grippers configuration). The purpose of the cleaner is to remove any lenses, lens parts, debris and fluid adhering to the grippers. For this purpose, the cleaner comprises an exhaust air box 1 having an interior. The exhaust air box 1 comprises sixteen inlet openings 2 (not shown in FIG. 1, see FIG. 2a, FIG. 2b and FIG. 2c) and an outlet opening 3 which is in fluid communication with the interior of the exhaust air box 1. The outlet opening 3 is capable of being connected to an aspirator. The exhaust air box 1 also comprises a maintenance lid 8 which can be opened for allowing access to the interior of the exhaust air box 1. A retainer sieve (not shown) capable of retaining lenses, lens parts, and debris is arranged in the interior of the exhaust air box 1. The retainer sieve is arranged in the interior of the exhaust air box 1 such to be passed by the air sucked into the interior of the exhaust air box 1 through the inlet openings 2 (see again FIG. 2a, FIG. 2b and FIG. 2c).

On the exhaust air box 1, a cleaner head 4 is arranged. The cleaner head 4 comprises eight pairs of receiver sleeves 5 (including a first pair of receiver sleeves 5') as well as eight corresponding shutters 6 (including a first shutter 6'). The lower ends of the receiver sleeves 5 may be in fluid communication with the interior of the exhaust air box 1 through the inlet openings 2 (see again FIG. 2a, FIG. 2b and FIG. 2c), and suction may be applied to the interior of the exhaust air box 1 to generate an exhaust air flow in exhaust air box 1. The pneumatically driven shutters 6 arranged at the lower end of the receiver sleeves 5 allow the lower ends of the receiver sleeves 5 to either be in fluid communication with the interior of the exhaust air box 1 or to be shut off. The shutters 6 are arranged between the receiver sleeves 5 and the inlet openings 2 of the exhaust air box 1 (as regards the direction of flow of air) and may be operated to individually open or close the fluid communication between the respective receiver sleeve 5 and the interior of the exhaust air box 1 with the aid of the corresponding pneumatic linear drive 7. Each individual shutter 6 is thus designed to open or close the fluid communication between one pair of receiver sleeves 5 and the interior of the exhaust air box 1 through the inlet openings 2 in the exhaust air box 1.

In the embodiment shown, the cleaner head 4 is designed as having eight separate shutters 6 and eight pair of receiver sleeves 5 (each shutter 6—when being operated—opening and closing the fluid communication between one pair of receiver sleeves 5 and the interior of the exhaust air box 1). The cleaner head 4 comprising the shutters 6 and the receiver sleeves 5 may, however, also be made from one block.

FIGS. 2a, 2b and 2c show a cleaning station comprising a cleaner (as shown in FIG. 1) and a plurality of grippers 10 corresponding to the plurality of receiver sleeves 5 (only the two grippers 10 of a pair of grippers 10 and the two receiver sleeves 5 of a corresponding pair of receivers sleeves 5 being visible in FIG. 2). The receiver sleeves 5 are connected to the exhaust air box 1 through the inlet openings 2. The receiver sleeves 5 are elongated tubular sleeves that have a sleeve wall having an inner surface surrounding an interior space of the sleeve which is circular in cross section and has an inner diameter. Correspondingly, the grippers 10 are elongated grippers that have a gripper wall having an outer surface which is circular in cross section, too, and which has an outer diameter. The inner diameter may, for example, be 22 mm (millimeters). The outer diameter may, for example, be 16 mm (millimeters). Thus, in such an embodiment the inner diameter is about 1.4 times (1.375 times, to be more precise) as large as the outer diameter.

To effect cleaning of the grippers 10, the grippers 10 are moved into the receiver sleeves 5 to a final position in the receiver sleeves 5, in which the gripper head 11 is arranged above the respective shutter 6 (FIG. 2a). Underpressure is applied to the outlet opening 3 (FIG. 1) of the exhaust air box 1 of the cleaner by means of an aspirator (not shown). One shutter 6 of the plurality of shutters 6 (for example the first shutter 6' shown in FIG. 1) is then operated to move into the 'open' position in which a fluid communication between the receiver sleeves 5 (for example the first pair of receiver sleeves 5' shown in FIG. 1) and the interior of the exhaust air box 1 is opened (FIG. 2b). Thus, air from the clean environment of the location or room where the production line is arranged is sucked through the receiver sleeves 5 and through the inlet openings 2 into interior of the exhaust air box 1. The grippers 10 are then introduced into the receiver sleeves 5 to a final position shortly above the position of the shutter 6 (such that the gripper head 11 cannot contact the shutter 6 (for example the first shutter 6' shown in FIG. 1) when the shutter 6 is operated to move into the 'closed' position in which the fluid communication between the receiver sleeves 5 (for example the first pair of receiver sleeves 5' shown in FIG. 1) and the interior of the exhaust air box 1 is closed. Introducing the grippers 10 into the receivers sleeves 5 results in that the air flowing through the annular cylindrical space between the inner surface of the sleeve wall of the receiver sleeve 5 and the outer surface of the gripper wall of the gripper 10 is substantially accelerated and just carries along any lenses, parts of lenses or liquids adhering to the gripper 10, and then continues to flow into the interior of the exhaust air box 1. The retainer sieve arranged in the interior of the exhaust air box 1 collects (i.e. retains) lenses, lens parts, and debris while allowing the exhaust air to pass the retainer sieve. This air continues to flow through the outlet opening 3 of the exhaust air box and then through the aspirator (and possibly a filter of the aspirator) back into the clean environment of the location or room where the production line is arranged. The retainer sieve arranged in the interior of the exhaust air box 1 may be emptied from time to time, for example once a day, and this can be performed by opening the maintenance lid 8 to get access to the interior of the cleaner.

In particular, when a plurality of grippers is cleaned, while underpressure is applied to the outlet opening 3 of the exhaust box 1 the first shutter 6' is operated to move into the 'open' position prior to introduction of the grippers 10 into the associated first pair of receiver sleeves 5'. The first shutter 6' may be closed once a time interval of e.g. 400 ms (milliseconds) has elapsed after the grippers 10 have arrived at the final position in the first pair of receiver sleeves 5'. Closing the first shutter 6' triggers the operation of the remaining shutters 6 to move into the 'open' position and back into the 'closed' position, one after the other in a similar manner. The remaining shutters 6 are operated sequentially one after the other and may remain opened for a time interval of e.g. 500 ms.

The air flow of the suction applied to the gripper 10 may for example be 200 m$^3$/h (cubical meters per hour), and the reduced pressure in the interior of the exhaust air box 1 may for example be 15 hPa below the atmospheric pressure at the cleaning station.

The invention claimed is:

1. Cleaner for cleaning grippers (10) for the transport of ophthalmic lenses such as contact lenses, in particular soft contact lenses, or intraocular lenses, the cleaner comprising:
   an exhaust air box (1) comprising
      at least one inlet opening (2) for allowing ambient air as well as lenses, lens parts, debris and fluid adhered to the grippers (10) to be sucked into an interior of the exhaust air box (1),
      an outlet opening (3) in fluid communication with the interior of the exhaust air box (1) for allowing exhaust air to be vented from the interior of the exhaust air box (1), the outlet opening (3) being capable of being connected to a vacuum source, and
   a cleaner head (4) arranged on the exhaust air box (1) and comprising
      a plurality of receiver sleeves (5) for receiving the grippers (10) to be cleaned, each receiver sleeve (5) of the plurality of receiver sleeves (5) being arranged such that it is capable of being in fluid communication with the interior of the exhaust air box (1) through the at least one inlet opening (2),
      a plurality of shutters (6), wherein each individual shutter (6) of the plurality of shutters (6) is arranged to open or close the fluid communication of at least one receiver sleeve (5) of the plurality of receiver sleeves (5), in particular a pair of receiver sleeves (5) of the plurality of receiver sleeves (5), and the interior of the exhaust air box (1).

2. Cleaner according to claim 1, wherein the cleaner further comprises linear drives (7), in particular pneumatic linear drives, to operate the shutters (6).

3. Cleaner according to claim 1, wherein the exhaust air box (1) comprises a retainer sieve arranged in the interior of the exhaust air box (1) such as to be passed by the air sucked into the interior of the exhaust air box (1) through the at least one inlet opening (2) and to retain the lenses, lens parts and debris sucked into the interior of the exhaust air box (1) through the inlet opening (2), and wherein the exhaust air box (1) further comprises a maintenance lid (8) which can be opened for allowing access to the retainer sieve to remove from the retainer sieve the lenses, lens parts and debris retained by the retainer sieve.

4. Cleaner according to claim 3, wherein the cleaner further comprises sensors for sensing the position of each shutter (6) of the plurality of shutters (6), the pressure of the vacuum in the interior of the exhaust box (1) and the position of the maintenance lid (8).

5. Cleaner according to claim 4, wherein the cleaner comprises a controller for monitoring the sensor outputs as well as for operating the shutters (6).

6. Cleaner according to claim 1, wherein the exhaust air box (1) further comprises a liquid separator for separating the liquid sucked into the interior of the exhaust air box (1), and a liquid outlet in fluid communication with the liquid separator, for discharging the liquid from the liquid separator.

7. Cleaner according to claim 1, wherein the cleaner head (4) comprising the shutters (6) and the receiver sleeves (5) is made of one block.

8. Cleaning station comprising a cleaner according to claim 1, a plurality of grippers (10) corresponding to the plurality of receiver sleeves (5) and a vacuum source connected to the outlet opening (3) of the exhaust air box (1), wherein the receiver sleeves (5) have a sleeve wall having an inner surface surrounding an interior space of the sleeve (5) which is circular in cross section and has an inner diameter,
   and wherein the grippers (10) have a gripper wall having an outer surface which is circular in cross section and has an outer diameter, and wherein the inner diameter is at most 2.5 times as large as the outer diameter, particularly at most 1.5 times as large as the outer diameter.

9. Cleaning station according to claim 8, wherein the cleaner comprises a sensor for sensing the pressure of the vacuum in the interior of the exhaust box (1) and a controller for monitoring the sensor output of the sensor for sensing the pressure of the vacuum in the interior of the exhaust air box (1) as well as for controlling the vacuum source.

10. Method of cleaning grippers for the transport of ophthalmic lenses, in particular contact lenses or intraocular lenses, the method comprising:

providing a cleaner according to any one of claim 1,
providing grippers (10) to be cleaned,
applying underpressure to the outlet opening (3) of the exhaust air box (1),
introducing the grippers (10) into the receiver sleeves (5) of the cleaner head (4),
operating the shutters (6) to open the fluid communications between the receiver sleeves (5) and the interior of the exhaust air box (1) through the inlet openings (2), in particular one after the other or pairwise, in order to apply suction to the grippers (10), and
retracting the grippers (10) from the receiver sleeves (5).

11. Method according to claim 10, wherein first the underpressure is applied to the outlet opening (3) of the exhaust air box (1), and wherein a first shutter (6') of the shutters (6) is then operated to open a first one or a first pair of the fluid communications between a corresponding first one or a first pair of the receiver sleeves (5) and the interior of the exhaust air box (1) prior to introducing the grippers (10) into the receiver sleeves (5), and wherein the first shutter (6') is operated to close the first one or the first pair of fluid communications once a first predetermined time interval has elapsed after the grippers (10) have been introduced into and have arrived at a final position in the receiver sleeves (5), and wherein subsequently the remaining shutters (6) other than the first shutter (6') are operated one after the other, each of the operated remaining shutters opening and closing a respective further one or a respective further pair of fluid communications between a respective further one or a respective further pair of the plurality of receiver sleeves (5) and the interior of the exhaust air box (1), wherein each of the remaining shutters (6) is operated to close the respective further one or the respective further pair of fluid communications once a second predetermined time interval has elapsed after the respective further one or the respective further pair of fluid communications has been opened.

12. Method according to claim 10, wherein applying suction to the gripper (10) includes allowing an air stream to flow between an inner surface of the sleeve wall of the respective receiver sleeve (5) and an outer surface of the gripper wall of the respective gripper (10) introduced into the respective receiver sleeve (5).

13. Method according to claim 10, wherein the air flow of the suction applied to the grippers (10) is in the range of 200 m$^3$/h to 450 m$^3$/h.

14. Method according to claim 10, wherein the grippers (10) comprise gripper heads (11), and wherein the grippers (10) are moved into the receiver sleeves (5) such that the gripper heads (11) cannot contact the shutters (6) when the shutters (6) are arranged to close the fluid communications.

15. Method according to claim 10, wherein operating the shutters (6) to open and close the fluid communications between the receiver sleeves (5) and the interior of the air box (1) is performed in a time interval in the range of 200 ms to 800 ms.

* * * * *